US008706087B2

(12) United States Patent
Qu et al.

(10) Patent No.: US 8,706,087 B2
(45) Date of Patent: *Apr. 22, 2014

(54) METHOD AND APPARATUS FOR SENDING A MESSAGE FROM A WIRELESS DEVICE

(75) Inventors: Hai Qu, San Diego, CA (US);
Guangming Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,083

(22) Filed: Apr. 24, 2012

(65) Prior Publication Data

US 2012/0208516 A1 Aug. 16, 2012

Related U.S. Application Data

(62) Division of application No. 10/196,490, filed on Jul. 15, 2002.

(60) Provisional application No. 60/384,187, filed on May 29, 2002.

(51) Int. Cl.
*H04Q 7/20* (2006.01)

(52) U.S. Cl.
USPC .................. 455/412.1; 455/435.3; 455/552.1

(58) Field of Classification Search
USPC .................. 455/445, 422.1, 426.1, 517, 553; 370/351, 352, 356, 357, 255, 400, 428
See application file for complete search history.

(56) References Cited

U.S. PATENT DOCUMENTS 5,450,613 A 9/1995 Takahara et al.
5,682,460 A 10/1997 Hyziak et al.
5,854,985 A 12/1998 Sainton et al.
5,903,832 A * 5/1999 Seppanen et al. .......... 455/435.3
5,910,951 A 6/1999 Pearce et al.
5,930,239 A 7/1999 Turcotte
6,006,099 A 12/1999 Rondeau et al.
6,055,240 A 4/2000 Tunnicliffe
6,119,003 A * 9/2000 Kukkohovi ................ 455/435.2
6,128,509 A 10/2000 Veijola et al.

(Continued)

FOREIGN PATENT DOCUMENTS

JP 10145318 5/1998
JP 2000278735 A 10/2000

(Continued)

OTHER PUBLICATIONS

International Preliminary Examination Report—PCT/US03/017119—IPEA/US, Dec. 20, 2004.

(Continued)

*Primary Examiner* — Sujatha Sharma
(74) *Attorney, Agent, or Firm* — S. Hossain Beladi

(57) ABSTRACT

A method, apparatus, and computer-readable media for sending a message from a multi-mode wireless device in a multiple communication mode environment. A preferred communication mode is selected from a plurality of communication modes supported by the wireless device. A preferred message service is selected based on contents of the message and the preferred communication mode. Then, compatibility of the preferred message service with an active communication mode of the wireless device is determined. If the preferred message service is compatible with the active communication mode, the message is sent by using the preferred service according to the active communication mode.

20 Claims, 3 Drawing Sheets

(56) References Cited

U.S. PATENT DOCUMENTS

| | | |
|---|---|---|
| 6,185,413 B1 | 2/2001 | Mueller et al. |
| 6,374,112 B1 | 4/2002 | Widegren et al. |
| 6,522,884 B2 | 2/2003 | Tennison et al. |
| 6,608,832 B2 | 8/2003 | Forslow |
| 6,625,503 B1 | 9/2003 | Smith |
| 6,731,680 B1 | 5/2004 | Zornack |
| 6,785,556 B2 | 8/2004 | Souissi |
| 6,920,126 B2 | 7/2005 | Becher et al. |
| 6,944,473 B2 | 9/2005 | Irwin et al. |
| 6,978,144 B1 | 12/2005 | Choksi |
| 7,184,768 B2* | 2/2007 | Hind et al. ............... 455/435.3 |
| 7,212,810 B2* | 5/2007 | Babbar et al. ............. 455/414.1 |
| 7,251,252 B2* | 7/2007 | Norby ....................... 370/466 |
| 2002/0059434 A1 | 5/2002 | Karaoguz et al. |
| 2002/0067714 A1 | 6/2002 | Crain et al. |
| 2002/0105932 A1 | 8/2002 | Miya |
| 2002/0132636 A1 | 9/2002 | Stockhusen |
| 2003/0017828 A1* | 1/2003 | Kotzin et al. ............... 455/434 |
| 2004/0116140 A1 | 6/2004 | Babbar et al. |
| 2004/0192301 A1* | 9/2004 | Shi ........................... 455/435.1 |
| 2004/0203745 A1* | 10/2004 | Cooper ..................... 455/432.1 |
| 2004/0247092 A1 | 12/2004 | Timmins et al. |

FOREIGN PATENT DOCUMENTS

| | | |
|---|---|---|
| JP | 4773090 | 7/2011 |
| WO | WO9817030 A1 | 4/1998 |
| WO | WO0041369 A1 | 7/2000 |
| WO | WO0163946 A1 | 8/2001 |

OTHER PUBLICATIONS

International Search Report—PCT/US03/017119, International Searching Authority—European Patent Office, Sep. 11, 2003.

* cited by examiner

METHOD AND APPARATUS FOR SENDING A MESSAGE FROM A WIRELESS DEVICE

CROSS REFERENCE

This application is a divisional application of U.S. patent application Ser. No. 10/196,490; filed Jul. 15, 2002, entitled "Method and Apparatus For Sending A Message From A Wireless Device" which claims priority of U.S. Provisional Application Ser. No. 60/384,187, filed May 29, 2002 entitled "Method and Apparatus for Providing Messaging Services with Multi-Mode Wireless Devices."

BACKGROUND

1. Field

The present invention relates to communication of data, and more particularly, to sending messages from a wireless device in a multiple communication modes environment.

2. Background

Various communication systems operating according to different communication protocols provide for communication of messages. Generally, communication of messages is provided through different message services. One of the message services is the short message service (SMS.) The SMS is a wireless message service for providing a medium for communication of alphanumeric messages of limited size. The communication of SMS messages may be between mobile devices, or a mobile device and a wireless network. The SMS may be used for a variety of communication services such as electronic mail, paging, facsimile, voice mail, or Internet access. The SMS is available in communication systems operating in accordance with the Global System for Mobile Communications (GSM) standard, and code division multiple access (CDMA) standards, such as CDMA1X, CDMA2000, and WCDMA. The standards may include a specific set of protocols for communication of data. Such specific protocols include the General Packet Radio Service (GPRS) and the Universal Mobile Telecommunications Service (UMTS).

Another type of message service is known as Enhanced Messaging Service (EMS.) The EMS allows users of EMS-compliant mobile devices to send and receive text, melodies, pictures, and simple sounds and animations, or a combination thereof. The EMS is also supported by a number of communication standards.

A mobile device having multiple communication modes may support the operations of communicating data in accordance with more than one standard. Therefore, the mobile device may be a multi-mode wireless device (MWD.) The MWD allows a user to send and receive voice and data over multiple wireless networks, each operating in accordance with a communication standard. The communication modes include, without limitation, operations in CDMA or GSM based systems, or GSM-based derivatives such as GPRS or UMTS. Other CDMA-based systems are also included, such as CDMA1X, CDMA2000, etc. The MWDs are generally compatible with the SMS and EMS for sending and receiving messages.

Most communication modes provide at least one message service. Each message service, however, has distinct formats, interfaces, and protocols for generating, sending, and receiving messages. In the past, mobile service providers required users to choose a single wireless system for their service. Thus, a wireless device had to support only one set of message services.

The proliferation of MWDs, however, requires the ability to support multiple message services for corresponding multiple communication modes, as well as each message service's unique standards. Currently, a user of an MWD must determine which wireless communication mode or modes is available for use, and must manually select an appropriate corresponding message service. Further, the MWD may employ a different application for each message service, and each application includes a distinct interface and set of procedures for sending a message.

There is therefore a need in the art for a method and apparatus for sending a message in which a wireless communication mode and a message service can be automatically selected.

SUMMARY

Embodiments disclosed herein address the above stated needs by providing a novel and improved method, apparatus, and computer-readable medium for sending messages from a wireless device. In accordance with various aspects of the invention, a wireless device supporting more than one wireless communication system executes a method for sending a message. The method includes selecting a preferred communication mode from a plurality of communication modes supported by the wireless device. The method further includes selecting a preferred message service based on contents of the message and the preferred communication mode. The method further includes determining compatibility of the preferred message service with an active communication mode of the wireless device, and if the preferred message service is compatible with the active communication mode, sending the message using the preferred service according to the active communication mode.

DETAILED DESCRIPTION

Figure 1:
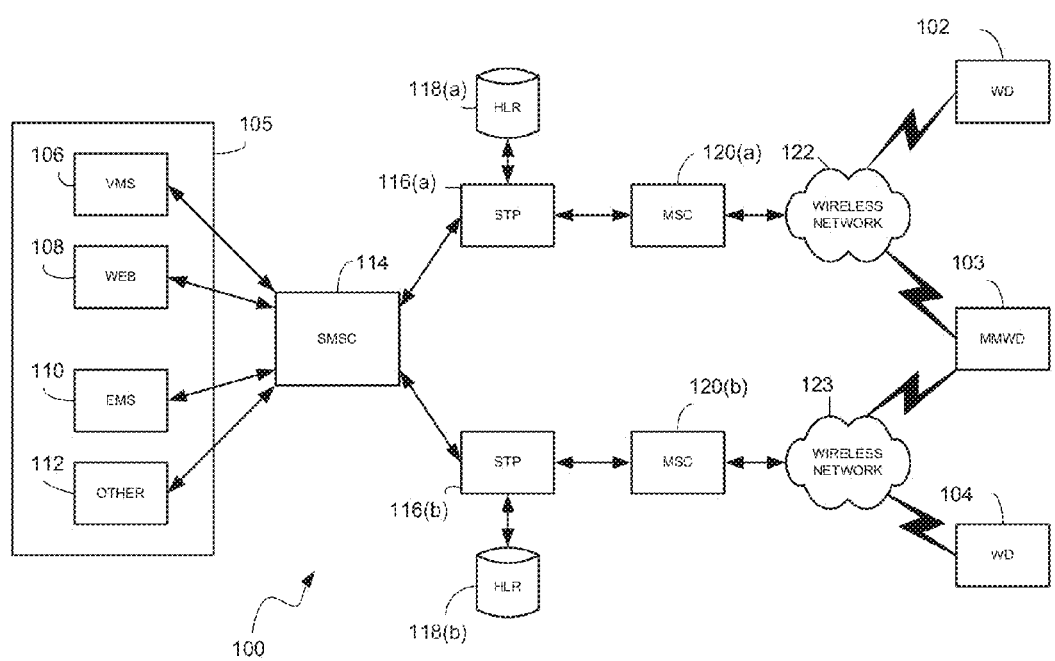
FIG. 1 illustrates a block diagram of a communication system having multiple wireless networks.

FIG. 1 is an illustration of a wireless communication system 100 capable of operating in accordance with various aspects of the invention. The communications at various block interfaces within the wireless communication system 100 may be compliant in accordance with the Interim Standard-41C, or variants thereof. The wireless communication system 100 may be integrated with other data communication systems. During operation, messages are communicated between wireless devices 102, 103, and 104 operated by respective users and one or more external short messaging entities (ESME) 105. Each wireless device may be any type of wireless communication device. Such devices may be connected or integrated with other types of devices, such as computers or devices operating like a computer. The wireless devices may also operate from a fixed location, such as a wireless local loop or a meter reading system, or a combination thereof. The wireless device 103 may be configured for operation in accordance with multiple communication standards in communication system 100. Therefore, the wireless device 103 may be a MWD.

The ESME 105 may include voice mail systems 106, the Internet or a closed Intranet 108, electronic mail system 110, and other systems 112 such as fax machines, pagers, terminals or computers. The system 100 includes a short message service center (SMSC) 114, also known as a message center. Other message centers may be employed to handle different message services. The SMSC 114 may be a combination of hardware and software for relaying, storing and forwarding messages between the ESME 105 and the wireless devices in communication system 100 via network paths 199 and 198.

The network paths 199 and 198 include one or more signal transfer points (STPs) 116(*a*) and 116(*b*), also known as gateways. The STPs 116(*a*) and 116(*b*) are connected with the SMSC 114 to enable IS-41C interconnections over signaling system 7 (SS7) links or similar channels with multiple network elements. Home location registers (HLR) 118(*a*) and 118(*b*) are connected with the STPs 116(*a*) and 116(*b*), respectively. Each HLR includes a database containing subscription data and service profiles of users. In response to a request from the SMSC 114, an HLR 118(*a*) or 118(*b*) provides routing information for an indicated user. Further, if a recipient is not available when a message delivery is attempted, the HLR 118 signals the SMSC 114 when the recipient is accessible and when the message is deliverable. Each STP is connected with one or more mobile switching centers (MSC) 120(*a*) and 120(*b*). Each MSC performs switching functions and controls message routing to and from respective radio access networks (RANs) 122 and 123. The wireless communications from RAN 122 and RAN 123 with the mobile devices may be in accordance with different over the air protocols as defined by different standards. For example, RAN 123 may operate in accordance with the GSM standard, and RAN 122 in accordance with the CDMA standard. The MWD 103 is capable to operate in accordance with both standards with RAN 122 and 123 respectively.

For purposes of simplicity, system 100 is shown with SMSC 114 in communication with two network paths 199 and 198. Each network path may include one signal transfer point (STP), one mobile switching center (MSC) and one radio access network (RAN). However, additional STPs, MSCs and RANs are also possible in each network path. Accordingly, the system 100 may include the ESME 105, SMSC 114, and a network path having at least one of each of an STP, MSC and RAN. The system 100 may include one or more SMSCs 114 or similar message centers.

In one example, the wireless device 102 is only compatible with the wireless network including the RAN 122 using a first wireless communication mode. Similarly, the wireless device 104 is only compatible with the wireless network including RAN 123 using a second wireless communication mode. Wireless device 102 could not communicate with the system 100 through the network path associated with RAN 123, nor could wireless device 104 communicate with the system 100 through the network path associated with the RAN 122. For example, RAN 122 may operate according to CDMA standard, and RAN 123 operates according to GSM standard. The MWD 103 may operate with both RANs 122 and 123.

For different communication modes such as CDMA and GSM modes, message services may require different formatting. For example, CDMA SMS messages are formatted differently than GSM SMS messages. The MWD 103, however, is configured to communicate with wireless networks connected to either RAN 122 or 123, even where they operate according to different communication modes. Wireless devices 102, 103 and 104 can receive different types of messages depending on the services to which they are subscribed. In particular, by operating according to more than one communication mode, the MWD 103 can receive messages from various sources operating in accordance with different communication modes, such as CDMA and GSM modes.

According to various aspects of the invention, the MWD 103 automatically selects a message service based on content of a message and on a communication mode used for communicating with an available wireless network. Alternatively, the MWD 103 selects one message service, from one or more message services it supports, based on a message to be communicated and a preferred communication mode.

Figure 2:
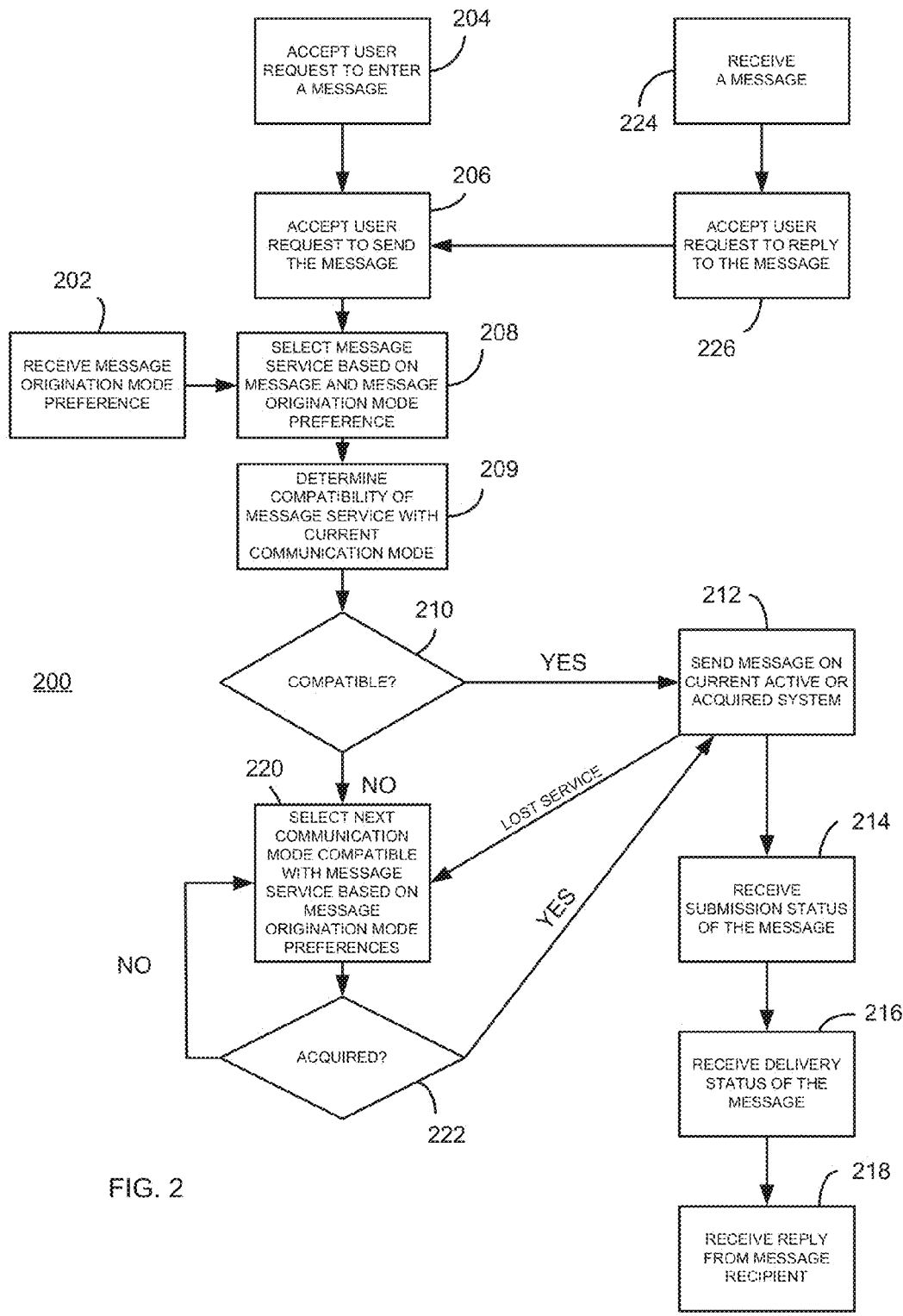
FIG. 2 illustrates a flow chart for sending a message in accordance with various embodiments of the invention.

FIG. 2 is a flowchart 200 illustrating various steps for sending a message from a MWD in a multiple communication mode environment in accordance with various aspects of the invention. At step 202, the MWD receives a message origination mode preference. The message origination mode preference is a signal or code that is input into the MWD, and may be provided by a user, manufacturer or service provider for setting a message origination mode.

The message origination mode selects or designates a preferred communication mode or priority scheme of communication modes from among the communication modes supported by the MWD. The preferred communication mode may be used by the MWD to originate (i.e. receive, format, and prepare) and send a message.

The message origination mode includes an automatic mode, in which any communication mode can be used for sending the message. In the CDMA1x-only mode, the message may only be sent to a CDMA1x-compliant network. In GSM/GPRS/UMTS mode, a CDMA1x communication mode cannot be used, and a message may be sent according to a mode consistent with several parameters of the message, such as size, content, etc.

A message can be originated either in response to a user request to enter a message at step 204, or as a reply to a message received by the MWD from an external sender at steps 224 and 226, which are explained in greater detail. In response to a user request, the MWD receives message content and forms a message according to a format and protocol required by the message origination mode. At step 206, the MWD receives a message send request from the user.

At step 208, the MWD selects a preferred wireless service from among the wireless services supported by the MWD. The selection is based on parameters of the message, and the message origination mode, if registered by the MWD. For example, if the message is an SMS message, and the text payload exceeds 140 bytes, then the message may be sent over a CDMA traffic channel, using service option 6 (SO6, rate set 1 of 9.6 kbps) or service option 14 (SO14, rate set 2 of 14.4 kbps). In another example, if CDMA is selected and the message exceeds the size limit of about 70 bytes for being sent on a CDMA access channel, the MWD will select either SO6 or SO14 and set up a call on the CDMA traffic channel. If the selected service option fails, the MWD will try another service option. If both service options fail, the MWD may try another mode such as WCDMA.

At step 209, the MWD compares the selected preferred message service with a currently-used, active communication mode of the device, if any, to determine whether they are compatible. If the preferred message service is compatible with the active communication mode, shown at decision step 210, the MWD sends the message using the preferred message service to a wireless network associated with the active communication mode at step 212.

If the preferred message service is not compatible with the current active communication mode, or if a network connection is lost before transmission of the message is completed, the MWD will select another communication mode as shown at step 220. The MWD selects a next communication imide based on compatibility with the preferred message service, and in accordance with preferences registered by the message origination mode preference, if any, if a network connection can be acquired using the next suitable communication mode as set forth at decision step 222, the MWD sends the message to a wireless network associated with the next suitable communication mode at step 212. If a network connection cannot be acquired, the MWD selects a next suitable communication mode at step 220.

To acquire a network connection using the next suitable communication mode, the MWD stops the protocol stack for the current active mode, and starts the protocol stack for the newly selected mode which causes a hardware and firmware change in order to tune into the newly acquired wireless network. Alternatively, the MWD may run multiple stacks concurrently. The MWD may listen to protocol information from the newly acquired wireless network, and establishes dialogues with the network (i.e, GSM location update, CDMA registration, etc).

If the message is sent successfully over the network, the MWD may receive a message submission status (CDMA transport layer Acknowledgement Message, GSM/UMTS Submit Report message, etc.) from the SMSC 114, as indicated at step 214. The message submission status is preferably received within the time period that is specified by the standards of the wireless system used. If the submission status indicates that the SMSC 114 accepted the message, and the user requested a message delivery status (CDMA Delivery Acknowledgement Message, GSM/UMTS Status Report message, etc.), the MWD may receive a message delivery status from the SMSC at step 216. If the user requested a reply to the sent message (CDMA User Acknowledgement, GSM Reply Path, etc.), the MWD may receive the requested reply at step 218.

Returning now to step 224, the MWD is able to receive a message from multiple available wireless networks according to multiple wireless communication modes. If the sender of such a message requests a reply, the MWD user generates the reply without having to know on which system or network the original message is received. Accordingly, at step 226, the MWD receives a user request to reply to the received message, and once the reply data is received and a reply message is formed, the MWD receives the user message send request at step 206. When replying to a received message, the MWD may select a communication mode used by the network when the received message is arrived. The flow of various steps then proceeds as set forth. Those with skill in the art would recognize that the steps in FIG. 2, representing steps for sending a message by a multi-mode wireless device, may be interchanged or reordered without departing from the main scope of the invention.

Figure 3:
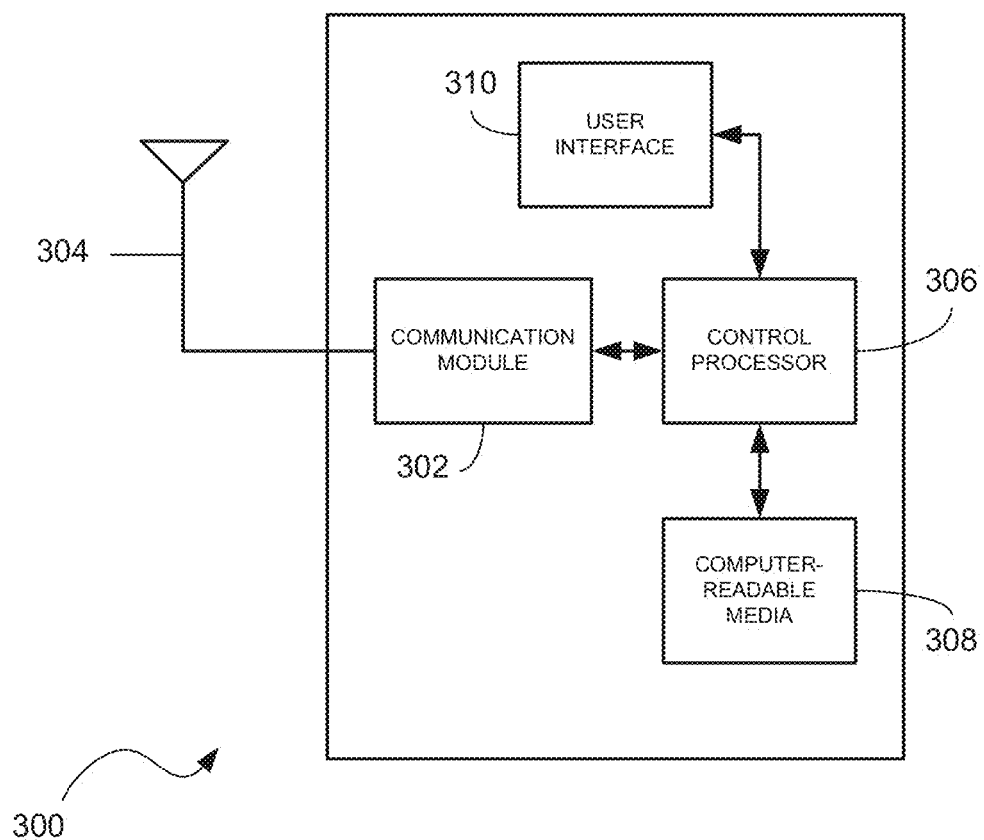
FIG. 3 illustrates a block diagram of a multi-modes wireless device for sending a message in accordance with various embodiments of the invention.

FIG. 3 is a block diagram 300 of a MWD 103 for sending a message in accordance with various aspects of the invention. The MWD 103 includes a communication module 302 that enables communication with a wireless network using different communication modes. The communication module 302 sends and receives control and traffic signals via antenna 304 while in communication with RAN 122 and 123 in accordance with corresponding protocols defined in relevant standards. The MWD 103 also includes a control processor 306 and computer-readable media 308. The computer-readable media 308 stores one or more software modules for execution by the control processor 306. The MWD 103 also includes a user interface 310 for receiving commands, requests, instructions, and data from a user, and for providing information to the user via, for example, a display in MWD.

Various steps defined and explained in relation to flowchart 200 depicted in FIG. 2 may be formed via software code or hardware or a combination of both, and incorporated in MWD 103 via computer-readable media 308 and control processor 306. Therefore, MWD 103 may operate in accordance with various aspects of the invention.

Those of skill would further appreciate that the various illustrative logical blocks, modules, functional blocks, and algorithm steps described in connection with the embodiments disclosed herein may be implemented as electronic hardware, computer software stored on computer-readable media, or combinations thereof. To clearly illustrate this interchangeability of hardware and software, various illustrative components, blocks, modules, circuits, and steps have been described above generally in terms of their functionality. Furthermore, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a wireless device. In the alternative, the processor and the storage medium may reside as discrete components in a user terminal connected with the wireless device.

What is claimed is:

1. A method of sending a message from a wireless device in a multi-mode environment, comprising:

selecting a particular communication mode from a plurality of communication modes supported by the wireless device;

after selecting the particular communication mode, selecting a particular message service based on contents of the message and based on the particular communication mode;

determining compatibility of the particular message service with an active communication mode of the wireless device; and if the particular message service is compatible with the active communication mode, sending the message using the particular message service according to the active communication mode, and if the particular message service is incompatible with the active communication mode, resetting the active communication mode to a second communication mode that is compatible with the particular message service.

2. The method of claim 1, further comprising:
receiving a message origination mode preference for setting a message origination mode including the particular communication mode,
wherein selecting the particular message service is further based on the message origination mode.

3. The method of claim 2, wherein the message origination mode preference comprises a signal received from a user, a manufacturer, or a service provider.

4. The method of claim 2, wherein the message origination mode preference indicates a priority scheme of the plurality of communication modes.

5. The method of claim 2, wherein the message origination mode includes an automatic mode in which each of the plurality of communication modes supported by the wireless device is usable to send the message.

6. The method of claim 1, wherein selecting the particular message service comprises, when the message comprises a short message service (SMS) message having a text payload exceeding one hundred forty bytes, selecting a code division multiple access (CDMA) traffic channel associated with service option six or service option fourteen.

7. The method of claim 1, wherein selecting the particular message service comprises, when a size of the message exceeds a code division multiple access (CDMA) access channel size limit, selecting a CDMA traffic channel associated with service option six or service option fourteen.

8. The method of claim 1, further comprising, when a network connection is lost before the sending of the message is completed, resetting the active communication mode to the second communication mode.

9. The method of claim 1, wherein a first protocol stack is associated with the active communication mode and a second protocol stack is associated with the second communication mode.

10. The method of claim 1, further comprising formatting the message according to the particular message service.

11. The method of claim 1, further comprising, if the particular message service is compatible with the second communication mode, sending the message using the particular message service according to the second communication mode.

12. The method of claim 1, wherein selecting the particular communication mode comprises selecting a communication mode in use when a received message arrives at the wireless device.

13. The method of claim 1, further comprising receiving a request to send the message in response to receiving content from a user.

14. An apparatus to send a message from a wireless device in a multiple communication mode environment, comprising:
a control processor configured to:
select a particular communication mode from a plurality of communication modes supported by the wireless device;
after selecting the particular communication mode, select a particular message service based on contents of the message and based on the particular communication mode; and
determine compatibility of the particular message service with an active communication mode of the wireless device; and
a communication module configured to send the message using the particular message service according to the active communication mode if the particular message service is compatible with the active communication mode, wherein the control processor is further configured to select a second communication mode compatible with the particular message service if the particular message service is incompatible with the active communication mode.

15. The apparatus of claim 14, further comprising:
a user interface configured to receive a message origination mode preference from a user, the message origination mode preference being configured to set a message origination mode including the particular communication mode from one or more communication modes supported by the wireless device, wherein the selecting of the particular message service is further based on the message origination mode.

16. The apparatus of claim 15, wherein the control processor is further configured to format the message according to the particular message service.

17. A non-transitory processor-readable medium comprising instructions that, when executed by a processor, cause the processor to:
select a particular communication mode from a plurality of communication modes supported by a wireless device;
after selecting the particular communication mode, select a particular message service based on contents of the message and based on the particular communication mode;
determine compatibility of the particular message service with an active communication mode of the wireless device; and
if the particular message service is compatible with the active communication mode, send the message using the particular message service according to the active communication mode, and if the particular message service is incompatible with the active communication mode, reset the active communication mode to a next communication mode that is compatible with the particular message service and the particular communication mode.

18. A method of sending a message from a wireless device, the method comprising:
receiving a message origination mode preference for setting a message origination mode, wherein the message origination mode includes a mode in which code division multiple access (CDMA) 1x-compliant networks are useable to send the message and non-CDMA1x-compliant networks are not useable to send the message;
selecting a particular communication mode from a plurality of communication modes supported by the wireless device;
after selecting the particular communication mode, selecting a particular message service based on contents of the message, based on the particular communication mode, and based on the message origination mode;
determining compatibility of the particular message service with an active communication mode of the wireless device; and
if the particular message service is compatible with the active communication mode, sending the message using the particular message service according to the active communication mode, and if the particular message service is incompatible with the active communication mode, resetting the active communication mode to a second communication mode that is compatible with the particular message service.

19. A method of sending a message from a wireless device, the method comprising:

receiving a message origination mode preference for setting a message origination mode, wherein the message origination mode includes a mode in which code division multiple access (CDMA) 1x-compliant networks are not useable to send the message;

selecting a particular communication mode from a plurality of communication modes supported by the wireless device;

after selecting the particular communication mode, selecting a particular message service based on contents of the message, based on the particular communication mode, and based on the message origination mode;

determining compatibility of the particular message service with an active communication mode of the wireless device; and if the particular message service is compatible with the active communication mode, sending the message using the particular message service according to the active communication mode, and if the particular message service is incompatible with the active communication mode, resetting the active communication mode to a second communication mode that is compatible with the particular message service.

20. The method of claim 1, wherein the particular message service is selected independent of the active communication mode.

* * * * *